United States Patent
Bello

[11] Patent Number: 6,047,930
[45] Date of Patent: Apr. 11, 2000

[54] AERIAL CABLE RETAINER WITH FULCRUM POINT

[75] Inventor: Salvatore Bello, Nashua, N.H.

[73] Assignee: Hendrix Wire & Cable, Inc., Milford, N.H.

[21] Appl. No.: 09/124,422

[22] Filed: Jul. 29, 1998

[51] Int. Cl.[7] .................................................. E21F 17/02
[52] U.S. Cl. .................. 248/61; 248/74.1; 248/316.5; 24/132 R; 24/132 WL; 24/136 R
[58] Field of Search ........................... 248/61, 74.1, 74.2, 248/316.5, 230.4; 24/136 R, 132 WL, 132 R

[56] References Cited

U.S. PATENT DOCUMENTS

| | | |
|---|---|---|
| 2,956,103 | 10/1960 | Steel et al. . |
| 3,049,585 | 8/1962 | Cochran . |
| 3,070,651 | 12/1962 | Semple et al. . |
| 3,460,787 | 8/1969 | Petze, Jr. . |
| 3,622,689 | 11/1971 | Sparks . |
| 3,913,187 | 10/1975 | Okuda . |
| 3,991,960 | 11/1976 | Tanaka . |
| 4,011,397 | 3/1977 | Bouche . |
| 4,020,277 | 4/1977 | LaChance, Sr. et al. . |
| 4,082,917 | 4/1978 | Hendrix ....................................... 248/61 |
| 4,083,523 | 4/1978 | Fisher . |
| 4,263,478 | 4/1981 | Willem . |
| 4,369,946 | 1/1983 | Palmer et al. . |
| 4,438,894 | 3/1984 | Yaotani et al. . |
| 4,440,374 | 4/1984 | Achille . |
| 4,480,149 | 10/1984 | Hawkins et al. . |
| 4,564,163 | 1/1986 | Barnett . |
| 4,566,660 | 1/1986 | Anscher et al. . |
| 4,623,102 | 11/1986 | Hough, Jr. . |
| 4,730,800 | 3/1988 | Engman ................................. 248/74.1 |
| 4,852,840 | 8/1989 | Marks .................................... 248/74.1 |
| 5,062,184 | 11/1991 | Rowland . |
| 5,133,523 | 7/1992 | Daigle et al. ......................... 248/74.1 |
| 5,161,759 | 11/1992 | Burns et al. . |
| 5,271,587 | 12/1993 | Schaty et al. . |
| 5,423,501 | 6/1995 | Yu . |
| 5,474,269 | 12/1995 | Kasubke ................................ 248/74.1 |
| 5,639,049 | 6/1997 | Jennings et al. . |
| 5,702,082 | 12/1997 | Evans et al. ........................ 248/230.4 |
| 5,833,195 | 11/1998 | Haynes .................................. 248/74.1 |

FOREIGN PATENT DOCUMENTS

| | | |
|---|---|---|
| 28 07 119 | 8/1979 | Germany . |
| 2 040 348 | 8/1980 | United Kingdom . |

*Primary Examiner*—Anita M. King
*Assistant Examiner*—Debbie Short
*Attorney, Agent, or Firm*—Piper Marbury Rudnick & Wolfe

[57] ABSTRACT

An aerial cable spacer is provided with a cable retainer. The cable retainer includes a cable retaining arm. A mid portion of the cable retaining arm includes a fulcrum point. The fulcrum point engages and exerts a force on the cable as the cable retaining arm bends to a closed position. In the closed position, the bent arm maintains a force on the cable.

15 Claims, 3 Drawing Sheets

6,047,930

AERIAL CABLE RETAINER WITH FULCRUM POINT

FIELD OF THE INVENTION

The invention relates to spacers for aerial cables for supporting one or more cables above the ground, and more particularly to a cable retainer for aerial cable spacers, the cable retainer having an improved clamping capability.

BACKGROUND OF THE INVENTION

Overhead conductor cables are commonly suspended from a messenger cable typically made of high strength alloys. The messenger cable is supported on poles or towers with the conductor cable spacers arranged at spaced intervals along the messenger cable to suspend one or more conductor cables. Since many power circuits require three phase electric power, it is often convenient to suspend conductor cables in groups of three. A spacer supports all three conductor cables and simultaneously maintains the conductors in spaced relation.

If the advantages of suspending conductors in this manner are to be fully availed, it is essential that the spacer be easily attached to the messenger cable and to the conductor cables. To provide ease of attaching the spacer to the cables and to reduce the number of parts required, the means for retaining the cables in their respective seats of the spacer should accommodate cables of varying cross sectional diameters without requiring bushings, sleeves, grommets or the like.

The construction of the spacer should be such that all of its parts have both high mechanical and electrical strength and are durable in use. In addition, all parts of the spacer should be economical to manufacture and to assemble.

U.S. Pat. No. 4,020,277 issued Apr. 26, 1977 to Hendrix Wire & Cable Corporation, the predecessor to the instant assignee, discloses a spacer for aerial cables. The spacer includes a body member having at least one generally arcuate cable retaining means adapted to engage a surface of the conductor cable and retain the cable in a concave seat of the spacer. One end of the cable retaining means is pivotally supported on the body member. Generally arcuate ratchet tooth means are provided adjacent the other end of the cable retaining means. Generally arcuate ratchet tooth means are also provided on the body member outwardly of the concave seat. The teeth of the retainer ratchet tooth means are engagable with the teeth of the body member ratchet tooth means when the retaining means is rotated about its pivotal support, thereby to firmly retain the conductor cable in the concave seat.

Hawkins U.S. Pat. No. 4,480,149 discloses a spacer for overheard electric lines. The cable is gripped between an inside elastomer bushing and an outside elastomer bushing. The bushing halves are compressed and held together about the conductor by a U-shaped resilient clip, which has snaps which are fitted into grooves disposed on the spacer.

However, it has been found in the prior art spacers that the force exerted on the cable is not satisfactory. Alternatively, it has been found that it is difficult to close the cable retainer with sufficient force exerted on the cable.

SUMMARY OF THE INVENTION

It is an object of the present invention to provide an aerial cable spacer which overcomes the above noted problems of the prior art.

It is a further object of the present invention is to provide an aerial cable spacer which exerts a high force on the cable.

It is still a further object of the present invention to provide an aerial cable spacer having a cable retainer which closes easily with a force exerted on the cable and which accommodates cables of a wide range of sizes.

It is yet a further object of the present invention to provide an aerial cable spacer having a cable retainer which closes easily with a force exerted on the cable and which can be used repeatedly without losing its effectiveness to retain the cable.

Yet a further object of the present invention is to provide an aerial cable spacer having a cable retainer which closes easily with a force exerted on the cable and which is cost effective to manufacture.

Still a further object of the present invention is to provide an aerial cable spacer having a cable retainer which closes easily with a force exerted on the cable and which is durable.

Still yet a further object of the invention is to provide a cable spacer made of the same material as the cable, thereby providing dielectric compatibility.

The present invention therefore provides, a device for supporting and spacing aerial cables, the device comprising: a main body portion, the main body portion having, a cable seat, and a first side adjacent the cable seat, a second side adjacent the cable seat and opposite from the first side; and a cable retaining arm having, a first end pivotally coupled to the second side of the main body portion, a second end, the second end having a means for releasably engaging the first side of the main body portion, and mid portion, the mid portion having a fulcrum portion, whereby the cable retaining arm is capable of closing upon a cable positioned in the cable seat with the fulcrum portion engaging and applying a force to the cable.

DETAILED DESCRIPTION OF THE PREFERRED EMBODIMENT

Figure 1:
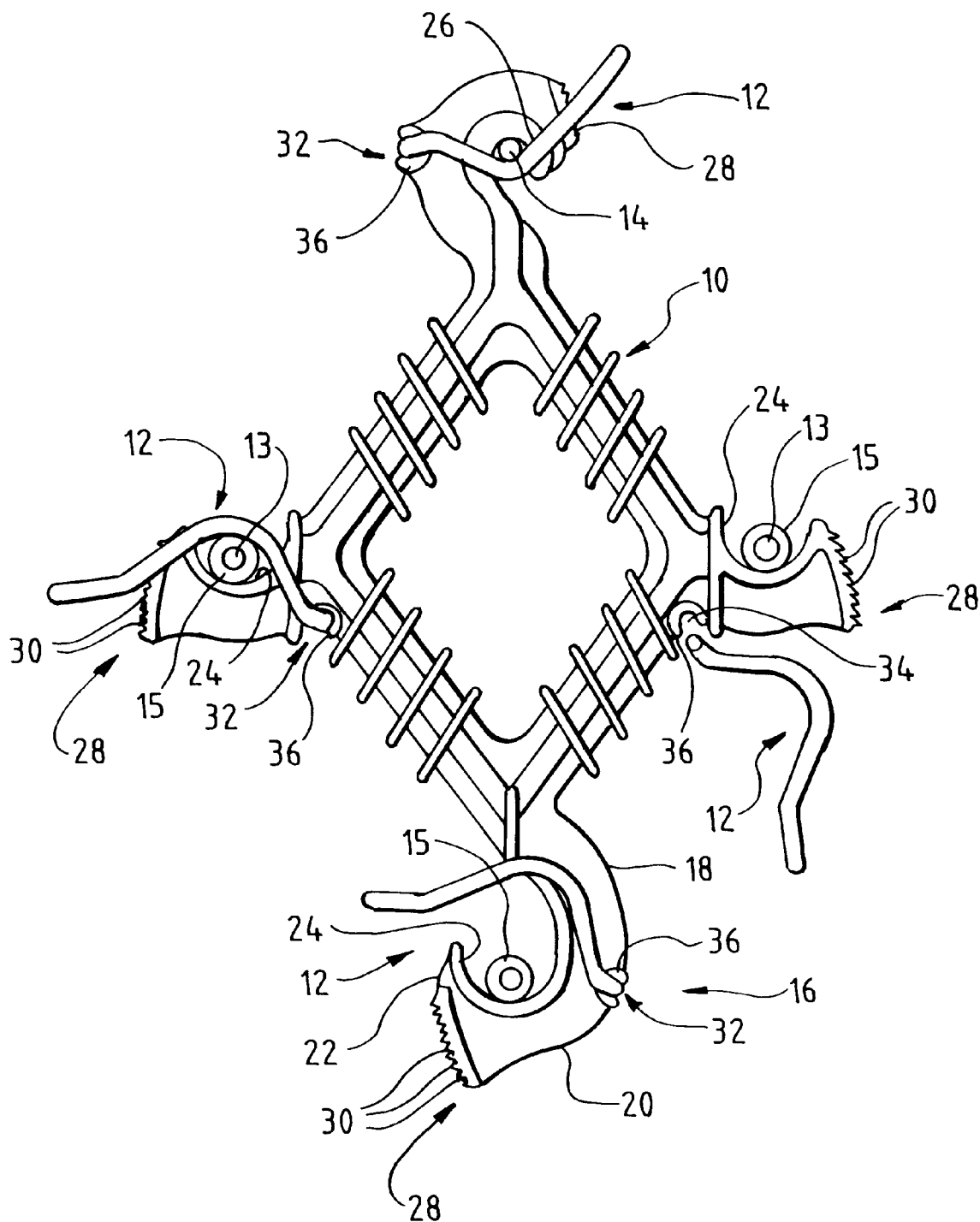
FIG. 1 is an elevational view of a prior art aerial cable spacer, having a plurality of cable retainers.

The prior art spacer shown in FIG. 1 includes the body member 10 and four generally arcuate cable retaining means 12. The spacer secures three conductor cables 13 and is suspended by a messenger cable 14. The conductor cable 13 includes insulating sheaths 15.

Both the body member 10 and the retaining means 12 are made from a thermoplastic material, the preferred embodiment being a polymer which has a low dielectric constant and has both weather and track resistant qualities.

The body member 10 is provided with four hook portions 16 each having a neck portion 18, head portion 20 and end portion 22. The body member 10 is further provided with three generally concave conductor cable seats 24 and a generally concave messenger cable seat 26.

The body member 10 is provided with four generally arcuate ratchet tooth means 28. Each ratchet tooth means 28 is located adjacent to the sides of the respective seat 24 and 26. Each ratchet tooth means 28 includes a plurality of teeth 30.

The body also comprises semi-cylindrical sockets 32. The sockets 32 are located adjacent to the sides of the respective seat 24 and 26. The sockets 32 are located opposite from the respective body ratchet tooth means 28. The sockets 32 are provided with slots 34 which are formed in part by the flanges 36 which form reinforcements for the sockets 32.

Figure 2:
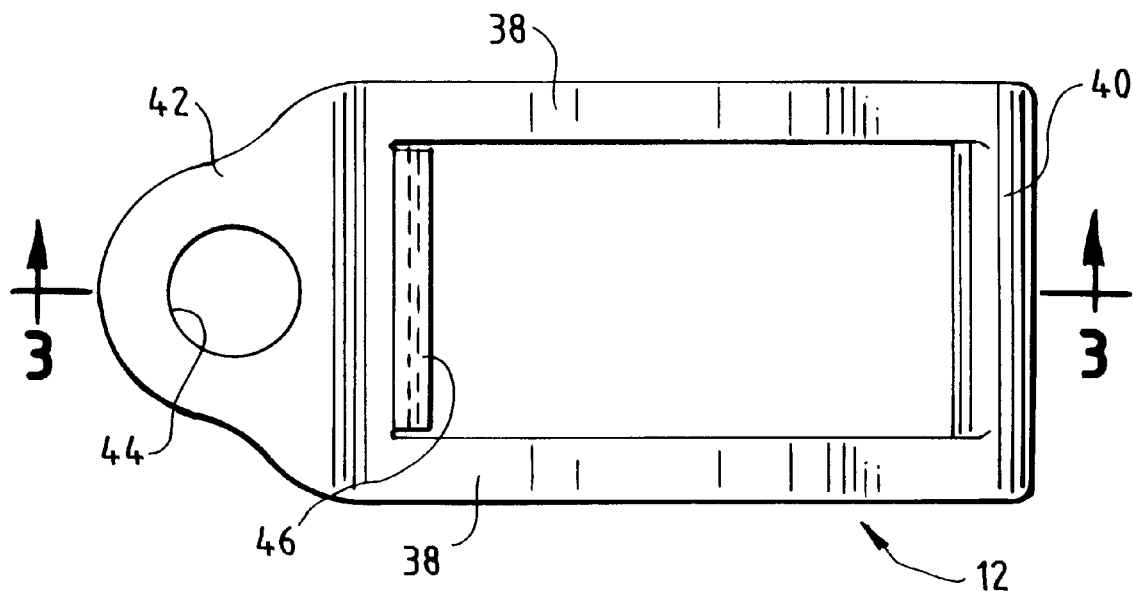
FIG. 2 is a plan view of one of the prior art cable retainers of FIG. 1.
Figure 3:
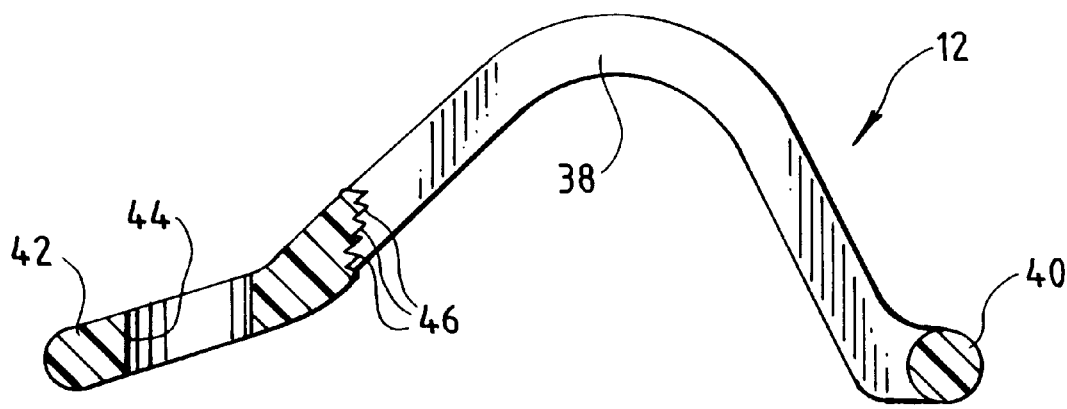
FIG. 3 is a cross-sectional view of the prior art cable retainer taken along line 3—3 of FIG. 2.

Each cable retaining means 12 comprises a pair of parallel spaced generally arcuate arms 38 (FIGS. 2 and 3), connected together at one end by a generally cylindrical member 40 and at the other end by a transverse member 42. The transverse member 42 is provided with a hole or perforation 44. The transverse members 42 of the retaining means 12 are also provided with generally ratchet tooth means 46.

Figure 4:
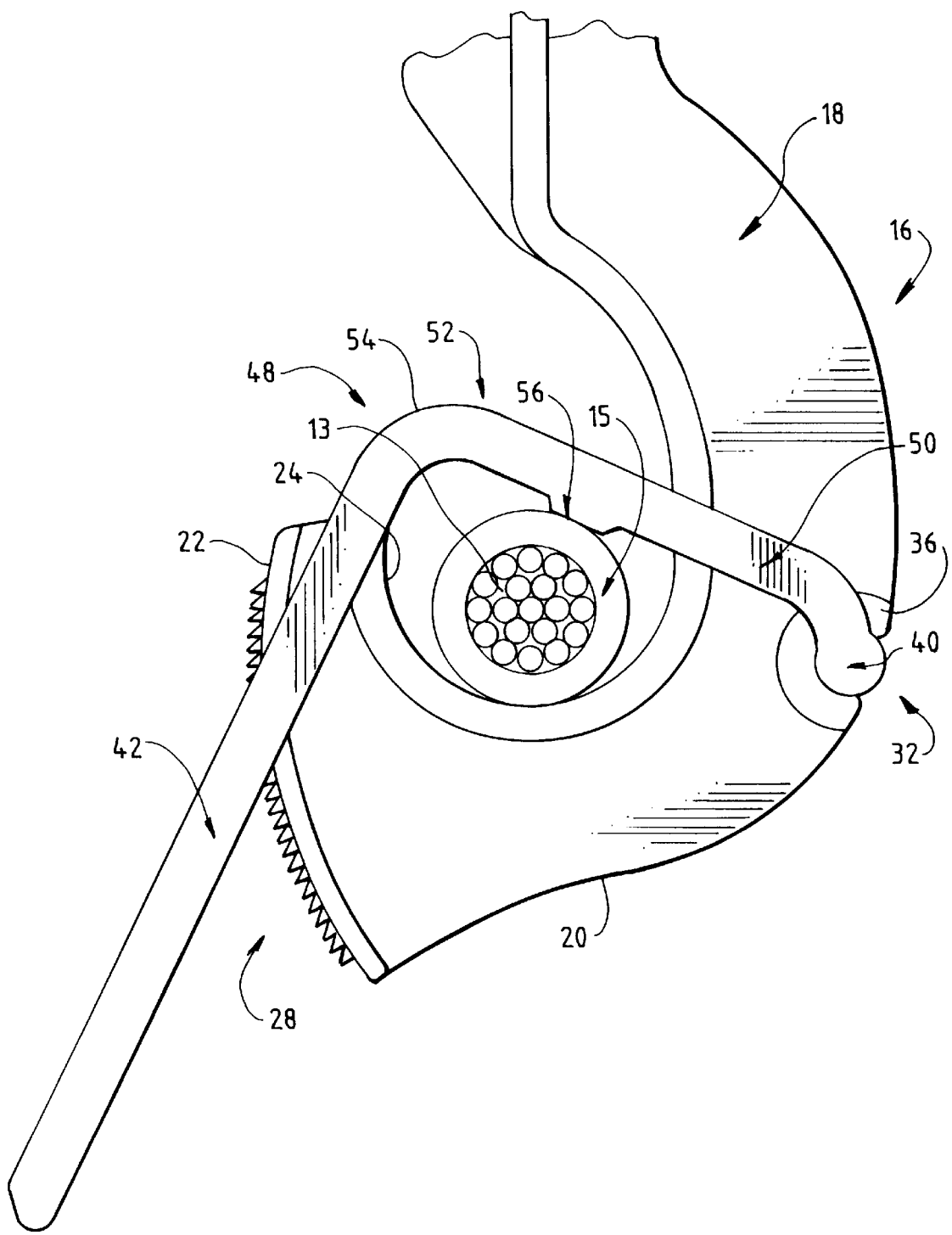
FIG. 4 is an elevational view of a cable retainer in accordance with the present invention.

FIG. 4 discloses the cable retaining means 48 in accordance with the present invention. Many of the features of the prior art are identical to certain features of the cable retaining means 48 of the present invention. Where the features of the prior art are identical to the present invention, the same reference numbers are used.

FIG. 4 shows a portion of the body members 10. The concave cable seat 24 is shown with the ratchet tooth means 28 on one side and the socket 32 located on the other side. The cable retaining means 48 includes a pair of spaced generally arcuate arms 50, one of which is shown in FIG. 4. Similar to the prior art arcuate arm 38 shown in FIGS. 2 and 3, the other arcuate arm (not shown) of the retaining means 48 is a mirror image of the arcuate arm 50 shown in FIG. 4. The pair of spaced generally arcuate arms 50 are L-shaped, with a mid portion 52 having an elbow 54 and a fulcrum portion 56. In the preferred embodiment, the cable retaining means 48, including the fulcrum portion 56, are formed as a single piece by an injection mold.

To assemble the parts of the spacer, it is only necessary to snap each of the generally cylindrical members 40 through the slots 34 and into the respective socket 32.

To install the spacer, the cable retaining means 48 are rotated to open positions in which they are temporarily retained because of the snug fit between the generally cylindrical members 40 and the respective socket 32. The messenger cable seat 26 is then placed over the messenger cable 14 and the cable retaining means 48 adjacent to it is partially closed to hold the messenger cable 14 in its seat 26. Then the conductor cables 13 are positioned in the seats 24. The cable retaining means 48 are each rotated to closed positions so that the ratchet tooth means 46 engages the respective body member ratchet tooth means 28, and the fulcrum portions 56 of the generally arcuate arms 50 firmly contact the insulating sheaths 15 of the conductor cables 13. Further movement of the complete retaining means 48 will be restricted due to the engagement of the fulcrum portions 56 with the conductor cable 13. However, the pliable nature of the retaining means 48 will allow a certain degree of flexing between the fulcrum portions 56 and the transverse member 42. As a result, the retaining means 48 may be easily moved further in the closing direction with the engaging ratchet tooth means 46 and the body ratchet tooth means 28 locking the retaining means 48 in position with respect to the body member 10.

The further movement of the retaining means 48 beyond the initial contact of the fulcrum portions 56 with the cables 13, 14 introduces a spring force in the arcuate arm 50 which causes the fulcrum portions 56 to exert a respectively greater force on the cables 13, 14. Thus the conductor cables 13 are firmly held in their respective seats 24. The retaining means 48 for the messenger cable 14 is similarly rotated to a fully closed position so that the fulcrum portion 56 of its generally arcuate arm 50 firmly contacts the messenger cable 14 thereby to firmly hold it in its seat 26.

The holes or perforations 44 may be used to close and open the retaining means 48 by inserting a screwdriver or other elongate tool and, using the tool as a lever, either to tighten the retaining means 48 with respect to the cable 13, 14 or to pry it open so that it may be rotated to an open position in the event is becomes necessary to repair or replace the cables 13, 14.

It will be apparent to persons skilled in the art that a spacer embodying this invention is new, economical to manufacture and assemble and durable in use. It is also free from bushings, sleeves and grommets surrounding the messenger and conductor cables 13, 14 and the spacer can accommodate a wide range of cable sizes. Furthermore, it consists of only two parts, the body 10, and four cable retaining means 48 and all of these parts are made of the same polymeric material at the same time using a single mold cut. The body 10 and the retaining means 48 are weather and track resistant. In addition, the novel cable retaining means 48 is easily closed while also providing a sufficient force on the cable 13, 14.

While a preferred embodiment of a spacer for aerial cables embodying the invention has been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the invention as set forth in the appended claims.

What is claimed:

1. A device for supporting and spacing aerial cables, the device comprising:
    a main body portion, the main body portion having,
        a cable seat, and
        a first side adjacent cable seat, and
        a second side adjacent the cable seat and opposite from the first side; and
    a flexible cable retaining arm having,
        a first end pivotally coupled to the second side of the main body portion,
        a second end, the second end having a means for releasably engaging the first side of the main body portion, and
        mid portion, the mid portion having a fulcrum portion, whereby the flexible cable retaining arm is capable of closing upon a cable positioned in the cable seat, and being flexible so as to create a resilient force in conjunction with the fulcrum portion, engaging and applying this force to the cable and whereby the flexible cable retaining arm, with the fulcrum portion engaging the cable, allows further closing force to be applied to the second end and the cable, as the flexible cable retaining arm bends, and the releasably engaging means, being capable of securely locking the bent flexible cable retaining arm, maintains this force on the cable.

2. A The device of claim 1, wherein the first side of the main body portion includes a plurality of teeth and the releasably engaging means includes a portion capable of releasably engaging the plurality of teeth, whereby the cable retaining arm is releasably locked in a position to retain the cable in the cable seat.

3. The device of claim 1, wherein the mid portion includes an elbow portion the fulcrum portion being located between the elbow portion and the first end of the cable retaining arm.

4. The device of claim 1, wherein the fulcrum portion includes a projection extending from the retaining arm in a direction generally towards the cable seat with the cable retaining arm in a closed position.

5. The device of claim 1, wherein the cable retaining arm and fulcrum portion are formed as a single piece by an injection mold.

6. A device for supporting and spacing aerial cables, the device comprising:

at least one cable retainer, each of said at least one cable retainer having;
a cable seat,
a first adjacent cable seat,
a second side adjacent the cable seat and opposite from the first side, and
a flexible cable retaining arm having,
a first end pivotally coupled to the second side,
a second end, the second end having a means for releasably engaging the first side of the main body portion, and
mid portion, the mid portion having a fulcrum portion,
whereby the flexible cable retaining arm is capable of closing upon a cable positioned in the cable seat and being flexible so as to create a resilient force in conjunction with the fulcrum portion engaging and applying this force to the cable and whereby the flexible cable retaining arm, with the fulcrum portion engaging the cable, allows further closing force to be applied to the second end and the cable, as the flexible cable retaining arm bends, and the releasably engaging means, being capable of securely locking the bent flexible cable retaining arm, maintains this force on the cable.

7. The device of claim 6, wherein the first side of the cable seat includes a plurality of teeth and the releasably engaging means includes a portion capable of releasably engaging the plurality of teeth, whereby the cable retaining arm is releasably locked in a position to retain the cable in the cable seat.

8. The device of claim 6, wherein the mid portion includes an elbow portion, the fulcrum portion being located between the elbow portion and the first end of the cable retaining arm.

9. The device of claim 6, wherein the fulcrum portion includes a projection extending from the retaining arm in a direction generally towards the cable seat with the cable retaining arm in a closed position.

10. The device of claim 6, wherein the cable retaining arm and fulcrum portion are formed as a single piece by an injection mold.

11. An aerial cable spacer comprising:

a main body portion having a messenger cable retainer and at least one conductor cable retainer, each of the messenger and cable retainers having,
a hook portion extending in a plane and having,
a neck portion extending from the main body portion,
a head portion extending from the neck portion, the head portion forming a concave cable seat,
an end portion extending from the head portion,
a flexible cable retaining arm having,
first and second parallel arms, each arm having a first end pivotally coupled to the hook portion adjacent the concave cable seat and opposite from the end portion, a second end and a mid portion, the mid portion having a fulcrum portion,
a cross member having a first end and a second end, each cross member end connected to a respective second end of the first and second parallel arms, and
means for releasably engaging the end portion of the hook portion, the releasably engaging means extending from the cross member, whereby the flexible cable retaining arm is capable of closing upon a cable positioned in the cable seat with the fulcrum portion engaging and applying a force to the cable and whereby the flexible cable retaining arm, with the fulcrum portion engaging the cable, allows further closing force to be applied to the second end and the cable, as the flexible retaining arm bends, and the releasably engaging means, being capable of securely locking the bent flexible cable retaining arm, maintains this force on the cable.

12. The device of claim 11, wherein the end portion of the cable seat includes a plurality of teeth and the releasably engaging means includes a portion capable of releasably engaging the plurality of teeth, whereby the cable retaining arm is releasably locked in a position to retain the cable in the cable seat.

13. The aerial cable spacer of claim 11, wherein the mid portion includes an elbow portion, each fulcrum portion being located between the respective elbow portion and the respective first end of the parallel arms.

14. The aerial cable spacer of claim 11, wherein each of the fulcrum portions includes a projection extending from the retaining arm in a direction generally towards the cable seat with the cable retaining arm in a closed position.

15. The aerial cable spacer of claim 11, wherein each cable retaining arm and fulcrum portion are molded as a single piece.

* * * * *